July 27, 1965  A. ASHKIN  3,197,715
THIN FILM OPTICAL MASER
Filed Oct. 3, 1961
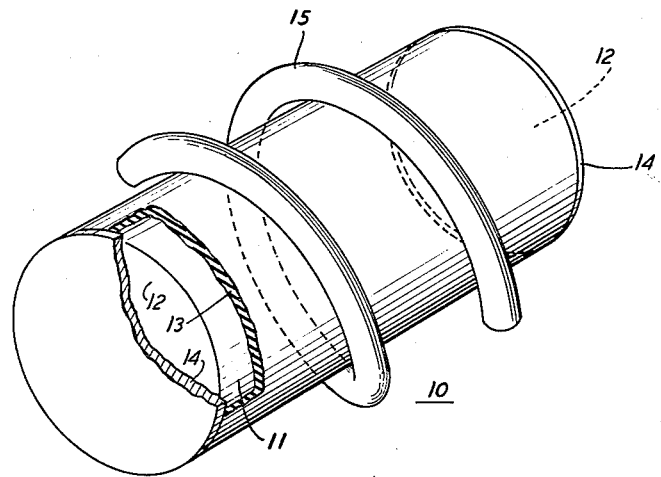
INVENTOR
A. ASHKIN
BY
ATTORNEY

United States Patent Office 3,197,715
Patented July 27, 1965

3,197,715
THIN FILM OPTICAL MASER
Arthur Ashkin, Bernardsville, N.J., assignor to Bell Telephone Laboratories, Incorporated, New York, N.Y., a corporation of New York
Filed Oct. 3, 1961, Ser. No. 142,563
4 Claims. (Cl. 331—94.5)

This invention relates to optical masers. More particularly it relates to solid state optical masers adapted for continuous wave operation.

A serious problem presently confronting workers in the optical maser art is the achievement of continuous wave operation of solid state optical maser devices. Hitherto the large amounts of power required to initiate maser action in solid state negative temperature media has necessitated the operation of such devices in short pulses only. This requirement is due primarily to the intense heat produced in the solid state maser medium by absorption of the pump power and to the relative inadequacy of provisions made for cooling the medium.

Accordingly, it is an object of this invention to achieve continuous wave maser operation in the optimal frequency range by means of apparatus requiring relatively low densities of pump power.

Another object of the invention is to achieve continuous wave operation of a solid state optical maser by providing means for adequate cooling of the negative temperature medium.

A further problem besetting workers in the optical maser are is that of mode selection in optical cavity resonators. The design of resonant structures in the microwave range of the electromagnetic spectrum is a relatively easy matter. Typically such structures have dimensions of the order of a wavelength in the frequency range of interest. This approach is in general not suitable for use in the optical frequency range due to the extreme smallness of the wavelengths involved. Unfortunately, however, structures which are large compared to the wavelength are usually characterized by a great number of resonant modes. In multimode structures some power is inevitably radiated by the maser medium into less desirable cavity modes, thereby increasing the amount of pump power needed to achieve the required power density in the desired mode. It can be seen that simplification of the mode structure of an optical maser cavity will result in a reduction of the pump power required to initiate and maintain maser action.

Therefore, it is also an object of this invention to achieve optical maser action with the aid of an optical cavity resonator having a relatively simple mode structure.

One structure which has been employed successfully in both solid state and gaseous optical masers is the parallel plate Fabry-Perot interferometer described in United States Patent 2,929,922 to Schawlow and Townes. A mathematical analysis of the resonant modes in this type of device is presented in an article by Fox and Li in the Bell System Technical Journal, vol. 40, page 453 (March 1961). In the case of solid state devices it has generally been the practice to prepare the interferometer by depositing a reflective coating on parallel surfaces of the active medium itself. These surfaces must be carefully aligned and thus require that extremely precise grinding and polishing operations be performed on crystals of, for example ruby. Such operations are difficult to perform and, consequently, effort has been directed to discovering arrangements in which they are not necessary. One solution to the problem is disclosed in copending patent application of A. G. Fox and L. U. Kibler, Serial No. 137,260, filed Sept. 11. 1961, and assigned to the assignee hereof, and now abandoned.

It is an additional object of this invention to provide a solid state optical maser cavity resonator which is formed without the need for grinding and polishing precisely parallel surfaces on the active medium. Thus, the invention provides an alternative to the approach disclosed in the above-mentioned copending application.

These and other objects of the invention are achieved in one illustrative embodiment thereof comprising an elongated cylindrical base crystal having flat and parallel end surfaces. A thin film negative temperature medium is deposited on the base crystal intermediate the end surfaces. An optical cavity resonator is formed by reflective coatings deposited on the end surfaces of the film layer. The word "cylinder" is used herein in the most general geometric sense to designate any surface generated by moving a line along a closed plane curve in such a manner as to be always parallel to another line which defines the axial direction of the cylinder.

It is a feature of the invention that the refractive index of the base crystal is less than that of the active medium.

It is also a feature of the invention that the reflective end surfaces forming the optical cavity resonator need not be precisely flat and parallel. Instead, as is disclosed hereinafter, a fairly wide tolerance is consonant with optical maser operation. It is an advantageous result of this feature that the fabrication of an optical maser embodying the invention is substantially simplified and facilitated.

The above-mentioned and other objects and features of the invention will be better understood from the following more detailed description taken in conjunction with the accompanying drawing in which:

The figure depicts an optical maser element in accordance with the principles of the invention.

Referring now to the drawing, there is shown an optical maser element 10 embodying the invention, comprising a cylindrical base crystal 11 having flat end surface 12.

A thin film negative temperature medium 13 is deposited on the base crystal 11 intermediate the end surfaces 12, which are covered with reflective layers or coatings 14. The film 13 is characterized by a higher refractive index than the base crystal 11.

In order to achieve maser action in the film 13, pump wave energy is applied thereto through its surface by means of lamp 15 which is connected to a power source, not shown in the figure. The pump power produces a population inversion between at least two of the energy levels in the film. It can be shown that the following condition must be satisfied in an optical maser in order for oscillation to occur:

(1) $$\frac{n_2-n_1}{\tau} \geq k\Delta\nu\frac{\alpha}{d}$$

where $n_2-n_1$ is the inverted population difference per unit volume, $\tau$ is the relaxation time between the energy levels defining the signal transition, $\Delta\nu$ is the width of the spectral line representing the signal transition, $\alpha$ is the loss of light energy for each traversal of the negative temperature medium, $d$ is the distance between reflectors and $k$ is a proportionality factor.

The left side of (1) is proportional to the power absorbed in the active medium per unit volume. Thus, for a given active medium it is desirable to increase $d$ and decrease $\alpha$ in order to minimize the power required for maser action. $\alpha$, which is dependent primarily upon the reflection losses at the mirrors forming the optical cavity is fixed once the mirror design is chosen. It follows that, for a given volume of active material having a specified density, the power absorbed may be reduced by increasing $d$ or, equivalently, by reducing the cross-sectional area.

However, a practical limit is imposed on the extent to which the cross-sectional area of the customary rod-shaped active medium may be reduced. This is so because of the increase in the losses due to diffraction of light around the edges of the mirrors. In general, the cross-sectional area of the medium cannot be reduced beyond the point where the diffraction losses approach the losses due to reflection. For the most favorable case, using confocal reflectors with 1% loss, the diameter of a rod-shaped negative temperature member may be reduced to about 10 mils. At a wavelength of 7000 angstrom units this is about 360 wavelengths. The mode structure in such a device is still extremely complex so that the power absorbed by the active medium, and hence the amount of heat produced, is quite large.

In accordance with one feature of the invention, however, the active film 13 is but a few wavelengths thick, thereby minimizing the amount of pump power required to initiate maser action. Because of the extreme thinness of the active medium, most of the light traveling back and forth between the reflective end surfaces will strike the boundaries of the layer at angles greater than the critical angle. Hence, by providing a thin film active medium having a refractive index higher than that of the base crystal or of the medium surrounding the optical maser element, the transmission of light between the mirrors is rendered essentially lossless.

In addition to alleviating the heat problem by reducing power requirements, an optical maser element embodying the invention is well adapted to dissipate whatever heat is generated in the active medium. Thus, the base crystal is in good thermal contact with the active film and provides a heat sink of relatively large capacity. Further improvements constitute, for example, the provision of a channel or bore in the center of the base crystal through which there may be circulated a coolant such as air or water. Alternatively, the base crystal may be provided with portions extending axially beyond the active film layer. Such extended portions may serve as cooling fins to improve the thermal contact between the base crystal and the environment of the optical maser element.

Furthermore, the extreme thinness of the active film results in an optical maser cavity which is characterized by a vastly simplified mode system. This is so because, in one dimension at least, the size of the cavity is of the same order as the wavelength of light to be produced. As a result, a greater part of the power emitted by the active medium is radiated into a single resonant mode of the cavity. It follows that the amount of pump power required for maser action is reduced due to the more efficient utilization thereof. In addition, a well-defined mode structure permits the application of nonreciprocal elements to the device when it is used as an amplifier.

An optical maser element in accordance with the invention may be fabricated in a number of ways known in the art. One such technique comprises the growing of a properly doped crystalline layer on a single crystal base having a lower refractive index. The active layer may be any of the crystals suitable for use in optical masers, such as ruby, while the base crystal is preferably selected from among those having a crystal structure somewhat similar to that of the active material. A suitable base for a ruby medium, for example, is provided by sapphire or undoped $Al_2O_3$. Alternatively, a base crystal may be grown to appropriate size and the active layer may be produced by diffusing the desired doping atoms into its surface. The end surfaces of the optical maser element may then be ground, polished, and silvered.

It is a further feature of the invention that, due to the localizaiton of the light in the thin film maser medium, the alignment of the reflective end surfaces forming the optical cavity is not critical. Thus, even if the reflective ends are not precisely parallel so that the light rays are reflected at an angle to the plane of the active film, the extreme thinness of the cavity tends to minimize losses through the surfaces of the film.

Although the invention is described herein with reference to a particular illustrated embodiment, many variations may be made by those skilled in the art without departing from its scope and spirit.

What is claimed is:

1. A solid state optical maser element comprising a cylindrical base member, and a thin film negative temperature medium on the cylindrical surface of said member, said element having substantially flat and parallel portions defining the edges of said thin film, said flat portions being substantially normal to the axial dimension of said base member, and said base member having a lower refractive index than that of said film.

2. An optical maser element as in claim 1 and further characterized by reflective coatings on said flat portions defining the edges of said film.

3. A solid state optical maser element comprising a cylindrical base member having a thin film negative temperature medium on the cylindrical surface thereof, said element having substantially flat and parallel portions which define the edges of said film, said flat portions being substantially normal to the axial dimension of said base member and said film having a higher refractive index than that of said base member, and means for iteratively reflecting light rays over paths which pass edgewise through said film.

4. An optical maser comprising a solid state optical maser element as in claim 3 and further including means for applying pump wave energy to said thin film negative temperature medium, and means for abstracting signal power from said film.

No references cited.

JEWELL H. PEDERSEN, *Primary Examiner.*